(12) United States Patent
Nadeau

(10) Patent No.: US 10,625,434 B1
(45) Date of Patent: Apr. 21, 2020

(54) TOMATO DICING ASSEMBLY AND METHOD OF USE

(71) Applicant: Dana Nadeau, Kilauea, HI (US)

(72) Inventor: Dana Nadeau, Kilauea, HI (US)

( * ) Notice: Subject to any disclaimer, the term of this patent is extended or adjusted under 35 U.S.C. 154(b) by 0 days.

(21) Appl. No.: 16/524,299

(22) Filed: Jul. 29, 2019

(51) Int. Cl.
*B26B 29/06* (2006.01)
*A47J 43/00* (2006.01)

(52) U.S. Cl.
CPC ............. *B26B 29/063* (2013.01); *A47J 43/00* (2013.01)

(58) Field of Classification Search
CPC . B26B 29/06; B26B 29/063; B26B 2029/066; B26D 3/18; B26D 3/185; B26D 7/00; B26D 7/0006; B26D 7/01
See application file for complete search history.

(56) References Cited

U.S. PATENT DOCUMENTS

| | | | | |
|---|---|---|---|---|
| 1,703,154 A * | 2/1929 | Lanzkron | ............... | B26B 29/063 83/762 |
| 1,764,235 A * | 6/1930 | Wilmking | ............. | B26B 29/063 83/762 |
| 2,089,980 A * | 8/1937 | Donham | ................. | A47J 17/00 83/762 |
| 2,108,992 A * | 2/1938 | Obenshain | ............ | B26B 29/063 83/762 |
| 3,058,503 A * | 10/1962 | Perakis | ................. | B26B 29/063 83/764 |
| 3,318,352 A * | 5/1967 | Seltzer | ................. | B26B 29/063 269/288 |
| 3,452,795 A * | 7/1969 | Davies | .................. | B26B 29/063 83/762 |
| 4,056,026 A * | 11/1977 | Panaritis | .............. | A22C 17/006 83/454 |
| 4,085,642 A * | 4/1978 | Birmingham | ......... | B26B 29/063 83/454 |
| 4,125,046 A * | 11/1978 | Kroh | ..................... | B26B 29/063 269/288 |
| 4,580,343 A * | 4/1986 | Bell, Jr. | ................ | B26B 29/063 269/3 |
| 4,934,026 A * | 6/1990 | McNerney | ........... | A22C 17/006 452/149 |
| 4,974,291 A * | 12/1990 | McNerney | ........... | A22C 17/006 220/495.11 |
| 5,499,578 A * | 3/1996 | Payne | ..................... | A47J 43/18 30/114 |

(Continued)

*Primary Examiner* — Jason Daniel Prone
*Assistant Examiner* — Richard D Crosby, Jr.
(74) *Attorney, Agent, or Firm* — Dale J. Ream

(57) ABSTRACT

A tomato dicing assembly and method for making tomato cubes from a tomato includes a cutting guide member, support member, and spike tube member that each has a tubular shape configuration that fit together concentrically. The cutting guide member includes a tubular wall extending longitudinally between proximal and distal ends, the cutting guide member including a cutting member defining a plurality of first cutting slots and body section defining second cutting slots transverse to the plurality of first cutting slots. The support member includes a continuous side wall defining having a closed upper end defining a plurality of holes spaced apart in a predetermined pattern and an open lower end. The spike tube member has a closed top including a plurality of spikes extending outwardly and are received through the plurality of holes when the spike tube member is received into the support member.

16 Claims, 9 Drawing Sheets

(56) References Cited

U.S. PATENT DOCUMENTS

| | | | | |
|---|---|---|---|---|
| 5,598,759 | A * | 2/1997 | Sie | B26B 29/063 116/200 |
| 6,889,835 | B2 * | 5/2005 | Land | B65H 49/08 206/408 |
| 7,198,152 | B2 * | 4/2007 | Barton | B23K 9/1333 206/409 |
| 8,286,355 | B2 * | 10/2012 | Aby-Eva | A47J 9/003 30/114 |
| D690,986 | S * | 10/2013 | Weng | D7/381 |
| 8,808,070 | B2 * | 8/2014 | Weng | A22C 17/002 452/194 |
| 9,636,831 | B1 * | 5/2017 | Furia | B26B 29/063 |
| 2004/0016131 | A1 * | 1/2004 | Hayashi | B26B 29/063 30/302 |
| 2004/0144227 | A1 * | 7/2004 | White | B26B 29/06 83/523 |
| 2006/0075870 | A1 * | 4/2006 | Wangler | B26B 29/063 83/651 |
| 2007/0125207 | A1 * | 6/2007 | Lucas | B26D 3/283 83/13 |
| 2010/0326291 | A1 * | 12/2010 | Wong | B26D 3/283 99/537 |
| 2011/0067545 | A1 * | 3/2011 | Robbins | B26D 3/283 83/698.71 |
| 2011/0192036 | A1 * | 8/2011 | Holcomb | B26B 3/04 30/279.2 |
| 2012/0160068 | A1 * | 6/2012 | Cahoon | B26D 3/24 83/23 |
| 2012/0279371 | A1 * | 11/2012 | Mulchi, Jr. | A22C 17/002 83/821 |
| 2013/0025421 | A1 * | 1/2013 | Trimarchi | B26B 29/063 83/30 |
| 2015/0075348 | A1 * | 3/2015 | Wheeler | B26D 7/0608 83/707 |
| 2015/0217470 | A1 * | 8/2015 | Lowetz | B26B 29/063 83/39 |
| 2017/0217036 | A1 * | 8/2017 | Turover | B26B 3/04 |
| 2019/0224876 | A1 * | 7/2019 | Getzinger | A47J 47/005 |
| 2019/0299478 | A1 * | 10/2019 | Pedraza | A47J 9/00 |

\* cited by examiner

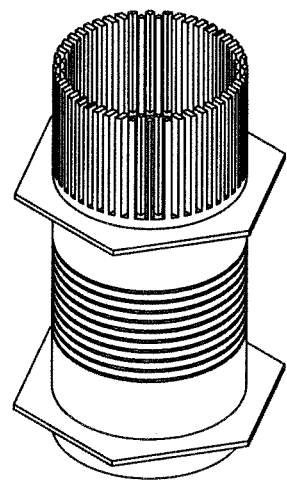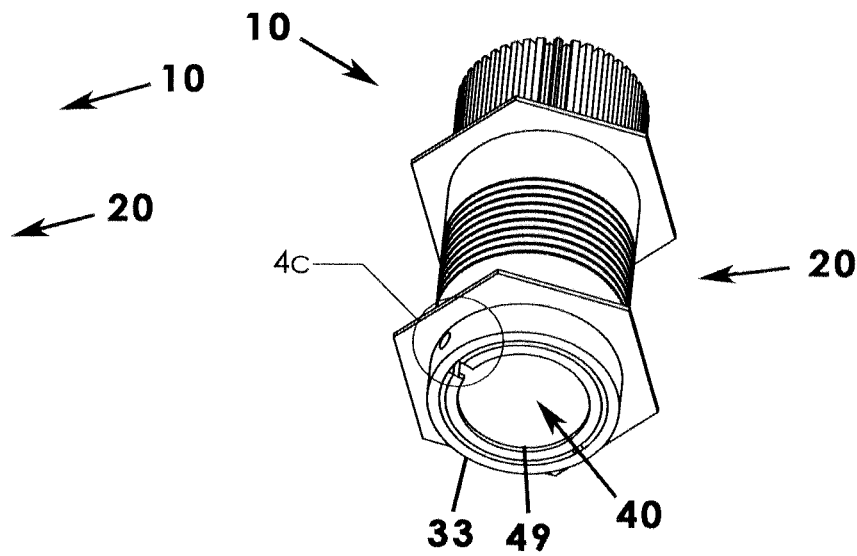
Fig.4a
Fig.4b
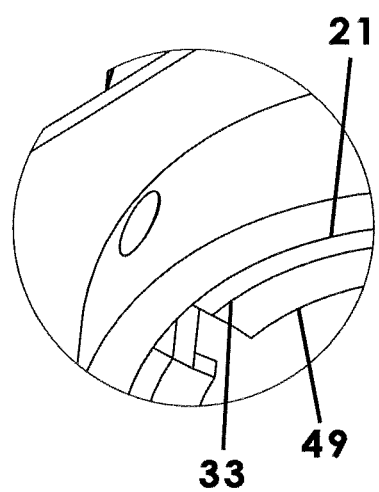
Fig.4c

TOMATO DICING ASSEMBLY AND METHOD OF USE

BACKGROUND OF THE INVENTION

This invention relates generally to fruit slicing devices and, more particularly, to a tomato dicing assembly that cuts a tomato into cubes and corresponding method of use.

Cutting tomatoes at home in the kitchen for use on salads or as an ingredient in other foods can be a time consuming and inefficient action. For instances, once a tomato is sliced in one direction and then in a second direction, the sliced portions fall in all directions and further slicing results in random configurations and the process simply continues for a time until the consumer is satisfied that most pieces have been cut sufficiently. Unfortunately, having uniform cubed tomato pieces is usually not achieved.

Various devices have been proposed in the art for slicing fruit in general but are complicated machines fit for food service contexts. Although presumably effective their intended uses, there is still a need for a simple tomato dicing assembly for use in a home environment.

Therefore, it would be desirable to have a tomato dicing assembly and method having three tubular components that may be assembled into a concentric device that holds a single tomato and enables a home user to slice it repeatedly into consistently perfect cubes. Further, it would be desirable to have a tomato dicing assembly that includes a plurality of spikes for holding the tomato and a plurality of cutting slots that enable uniform and consistent cutting of the tomato into cubes.

SUMMARY OF THE INVENTION

A tomato dicing assembly and method for making tomato cubes from a full tomato according to the present invention includes a cutting guide member, a support member, and a spike tube member that fit together as concentric tubes for holding a tomato while it is sliced into cubes. The cutting guide member includes a tubular outside wall having an open proximal end and a distal end and a body section extending longitudinally between the proximal and distal ends, the cutting guide member including a cutting member coupled to and extending longitudinally away from the distal end and defining a plurality of first cutting slots, the body section having a cylindrical side wall defining a plurality of second cutting slots transverse to the plurality of first cutting slots.

The support member includes a continuous support tube side wall having a tubular configuration and having a closed upper end and an open lower end, the closed upper end of the support member defining a plurality of holes spaced apart in a predetermined pattern. The spike tube member has a continuous side wall having a closed top and an open bottom, the spike tube member including a plurality of spikes extending outwardly from the closed top and that are spaced apart from one another according to the predetermined pattern. The plurality of spikes is selectively received through the plurality of holes when the spike tube member is received into the support member.

In use, a tomato is first received into an inner area defined by the cutting member while a knife slices the tomato sequentially through the first plurality of slots. Rotating the combined tubes 90 degrees, the tomato may again be sliced using the first plurality of slots. The spike tube member may be partly withdrawn and the tomato is sliced again by inserting a knife through the second plurality of slots on the body section of the cutting guide member. Then, the support member may be inserted deeper while the spike tube member is retracted partially or even removed completely so as to disengage the spikes and to deposit the three-times sliced tomato cubes, such as into a bowl.

Therefore, a general object of this invention is to provide a tomato dicing assembly for slicing a single tomato into a plurality of cubes for use on a salad or other food preparation.

Another object of this invention is to provide a tomato dicing assembly, as aforesaid, that includes three tubular components that may be assembled concentrically and slidably moved according to a method of use that results in the formation of tomato cubes.

Still another object of this invention is to provide a tomato dicing assembly, as aforesaid, that holds a tomato in position using a plurality of spikes for three slicing actions.

Yet another object of this invention is to provide a tomato dicing assembly, as aforesaid, in which the innermost tubular member may be partially removed before a third slicing action is made, resulting in the cubed tomato.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1b is an exploded view from a lower angle of the tomato dicing assembly of FIG. 1a;

FIG. 2a is an exploded view of the tomato dicing assembly taken from a rear angle;

FIG. 2b is an isolated view on an enlarged scale taken from a portion of FIG. 2a;

FIG. 3a is another exploded view of the tomato dicing assembly as in FIG. 2a;

FIG. 3b is an isolated view on an enlarged scale taken from a portion of FIG. 3a;

FIG. 4a is a perspective view of the tomato dicing assembly in a concentrically assembled configuration;

FIG. 4b is a perspective view from a bottom-up angle of the tomato dicing assembly of FIG. 4a;

FIG. 4c is an isolated view on an enlarged scale taken from a portion of FIG. 4b;

FIG. 5a is a side view of the tomato dicing assembly as in FIG. 4a;

FIG. 5b is a sectional view taken along line 5b-5b of FIG. 5a;

DESCRIPTION OF THE PREFERRED EMBODIMENT

Figure 1A:
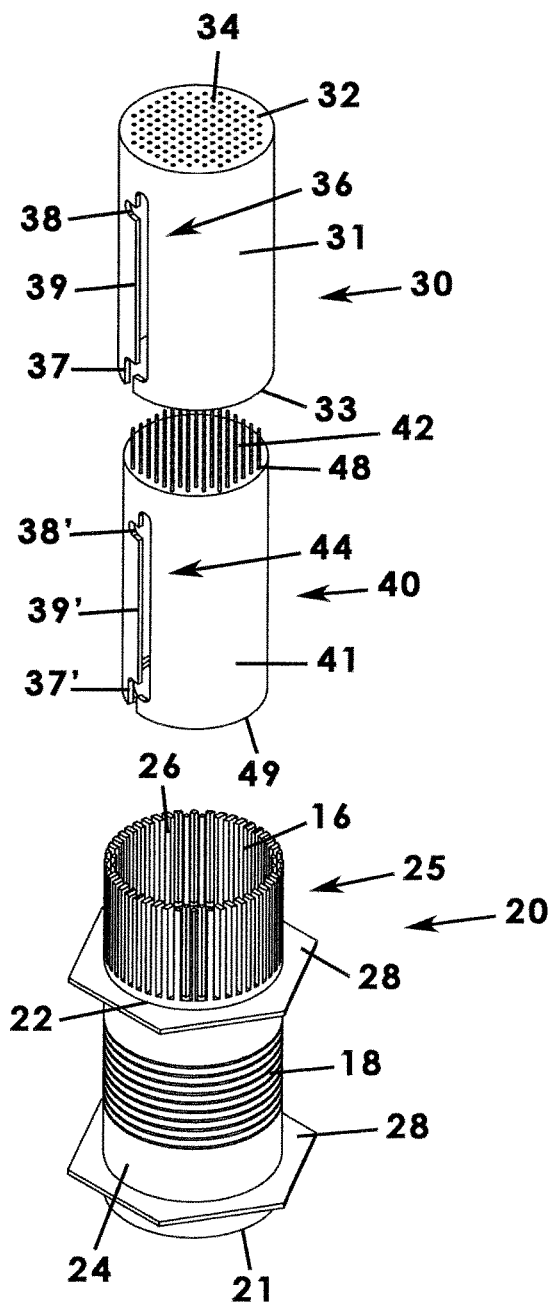
FIG. 1a is an exploded view of a tomato dicing assembly according to a preferred embodiment of the present invention.
Figure 1B:
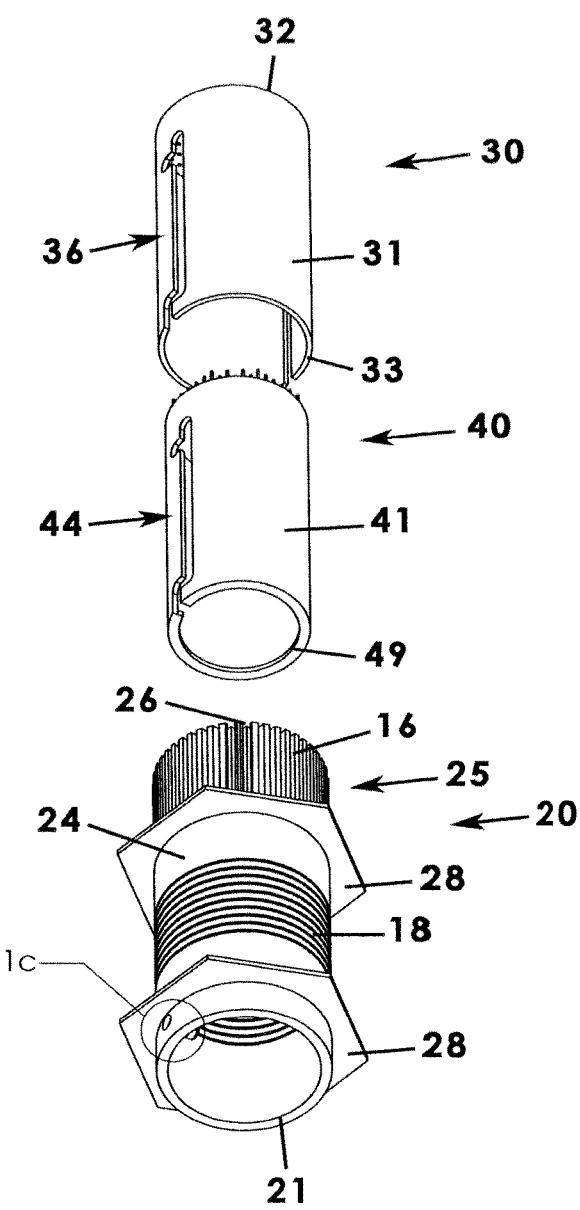
Figure 1C:
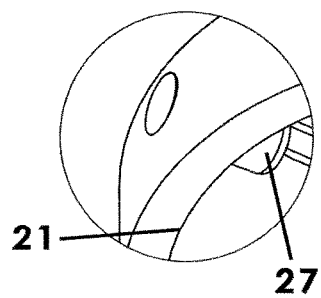
FIG. 1c is an isolated view on an enlarged scale taken from a portion of FIG. 1b.
Figures 2A, 2B:
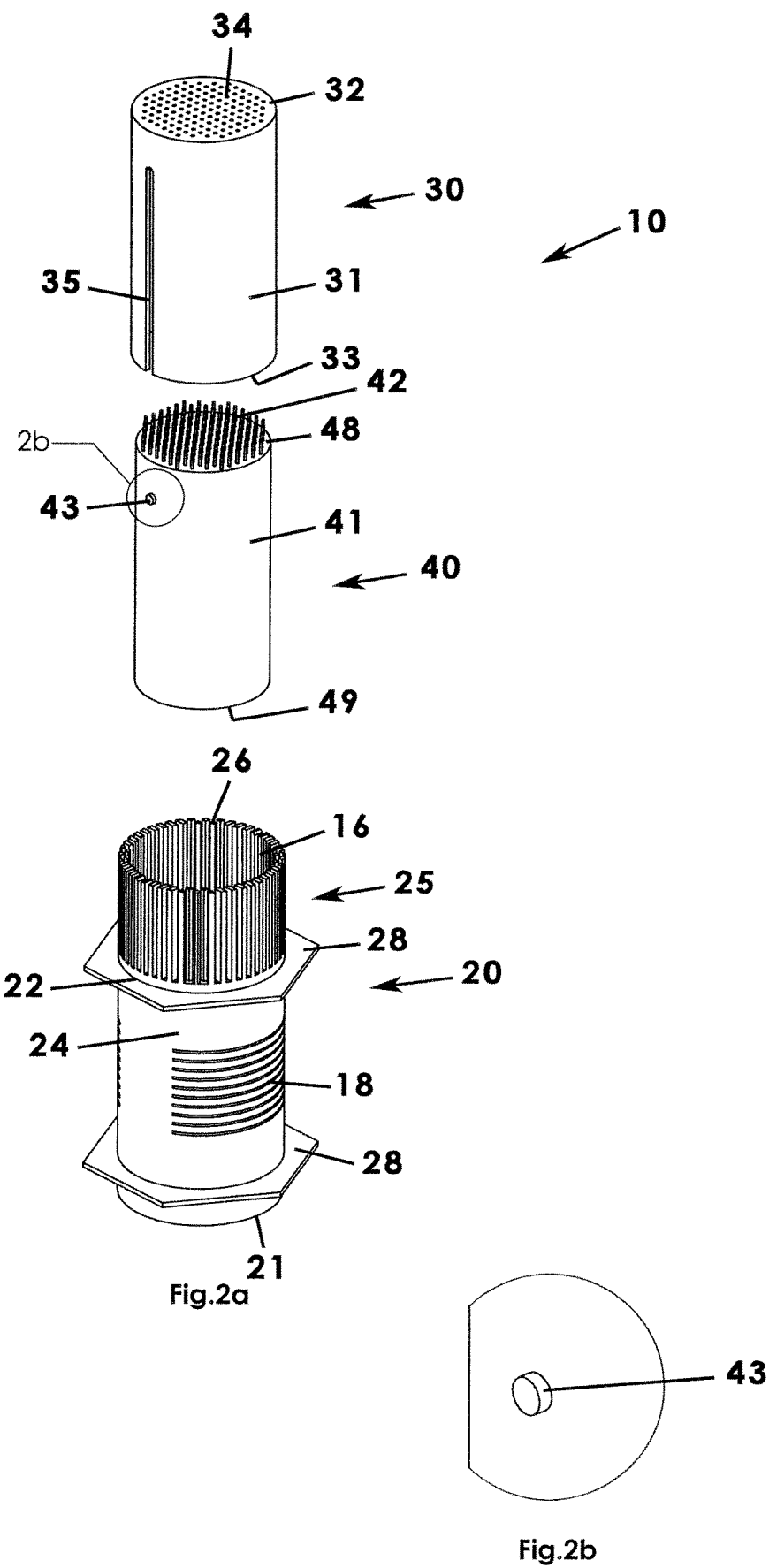
Figure 3A:
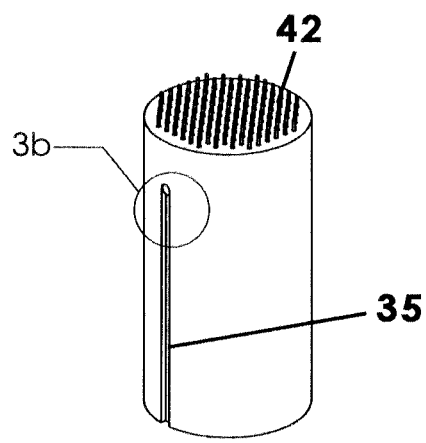
Figure 3A:
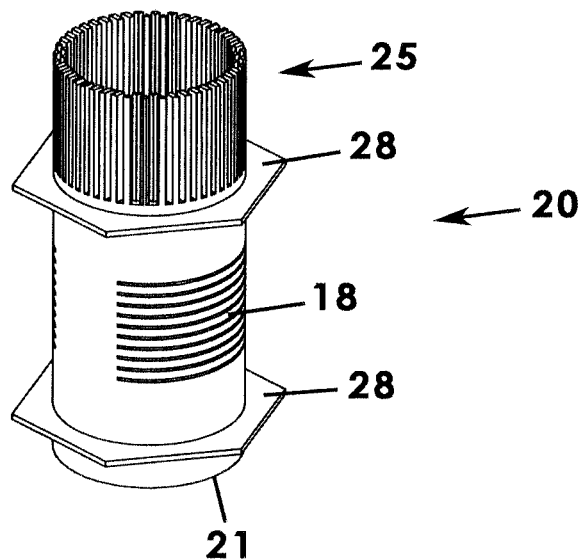
Figure 3B:
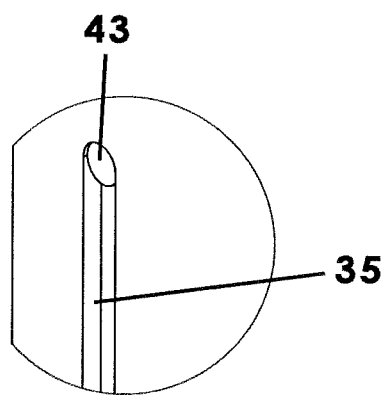
Figure 5A:
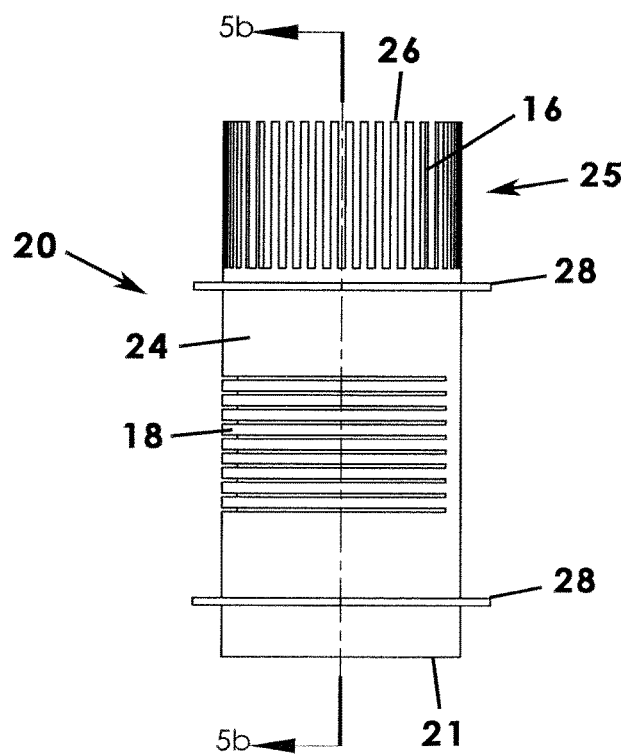
Figure 5B:
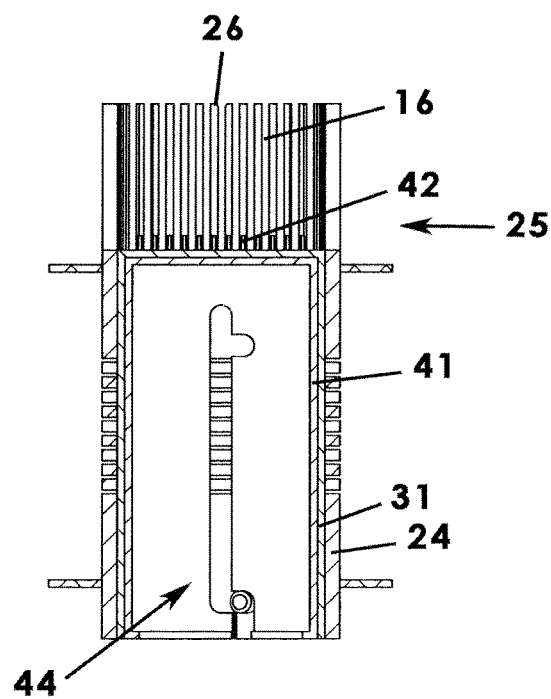
Figure 6:
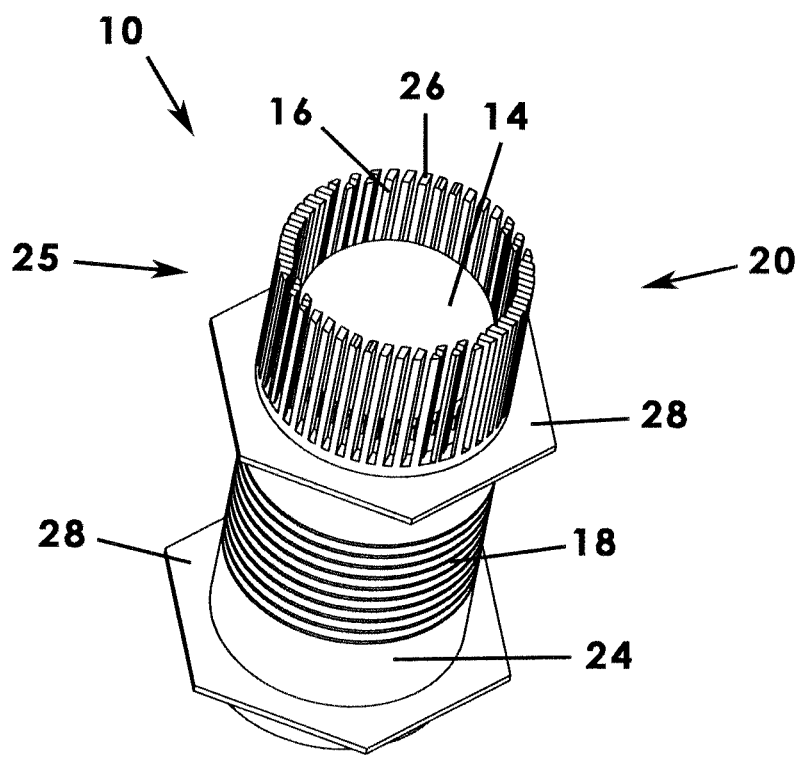
FIG. 6 is a perspective view of the tomato dicing assembly as in FIG. 4a with a tomato positioned in a cutting member of the cutting guide member.

An assembly and method for dicing a tomato according to a preferred embodiment of the present invention will now be described with reference to FIGS. 1a to 9 of the present invention. The tomato dicing assembly 10 for slicing and cubing a tomato includes three main components and the method for using the assembly involves a knife 12. Namely, the tomato dicing assembly 10 for cubing a tomato 14 includes a cutting guide member 20, a support member 30, and a spike tube member 40. Each of the three main components has a cylindrical or tubular configuration defining a hollow interior and may also be described as having a continuous side wall that forms a cylindrical housing and defines other critical openings as will be described later.

In use, the three tubes may be joined together via pins and slots as will be described and may be referred with reference to respective tubes or by their concentric combination. For instance, the three cylinders have the same inner shape configuration but proportionally different inner diameters. For clarity it will be understood that the tube referred to as the cutting guide member 20 is the outer-most cylinder 15 and has the largest inner diameter. The tube referred to as the support member 30 is the middle or center cylinder and has an outer diameter smaller than the inside diameter of the cutting guide member. Finally, the tube referred to as the spike tube member 40 is the innermost cylinder and has an outer diameter smaller than the inside diameter of the support member 30 and configured to be received into the support member 30. Accordingly, 20 the three tube members may also be referred to as the outer, center, and inner tubes.

The cutting guide member 20 includes a body section 24 that includes a tubular and continuous outside wall (i.e. a cylinder) having an open proximal end 21 and a distal end 22 opposite the open proximal end 21, the continuous outside wall defining an open interior area having a diameter larger than a diameter defined by continuous side walls of the support member 30 and spike tube member 40, respectively. The open proximal end 21 is in communication with the open interior area such that the support member 30 is slidably received into the open interior area thereof as will be described later.

The cutting guide member 20 includes a cutting member 25 mounted to and extending longitudinally away from the distal end 22 of the cutting guide member 20. The cutting member 25 includes a plurality of upstanding and rigid frame segments 26 that have linear configurations that are separated from one another and arranged in a ring-shape configuration. A plurality of first cutting slots 16 are defined by and between the plurality of frame segments 26, respectively, into which the blade of a knife 12 may be inserted for slicing the tomato 14 as will be described later. Each frame segment 26 may have a larger or smaller thickness or length than shown in the attached drawings and the plurality of frame segments 26 extend in the same longitudinal direction as the longitudinal axis of the body section 24. The distal end 22 of the cutting guide member 20 is also open for receiving a tomato into contact with the spikes of the spike tube member 40 as will be described later.

Figures 7A, 7B:
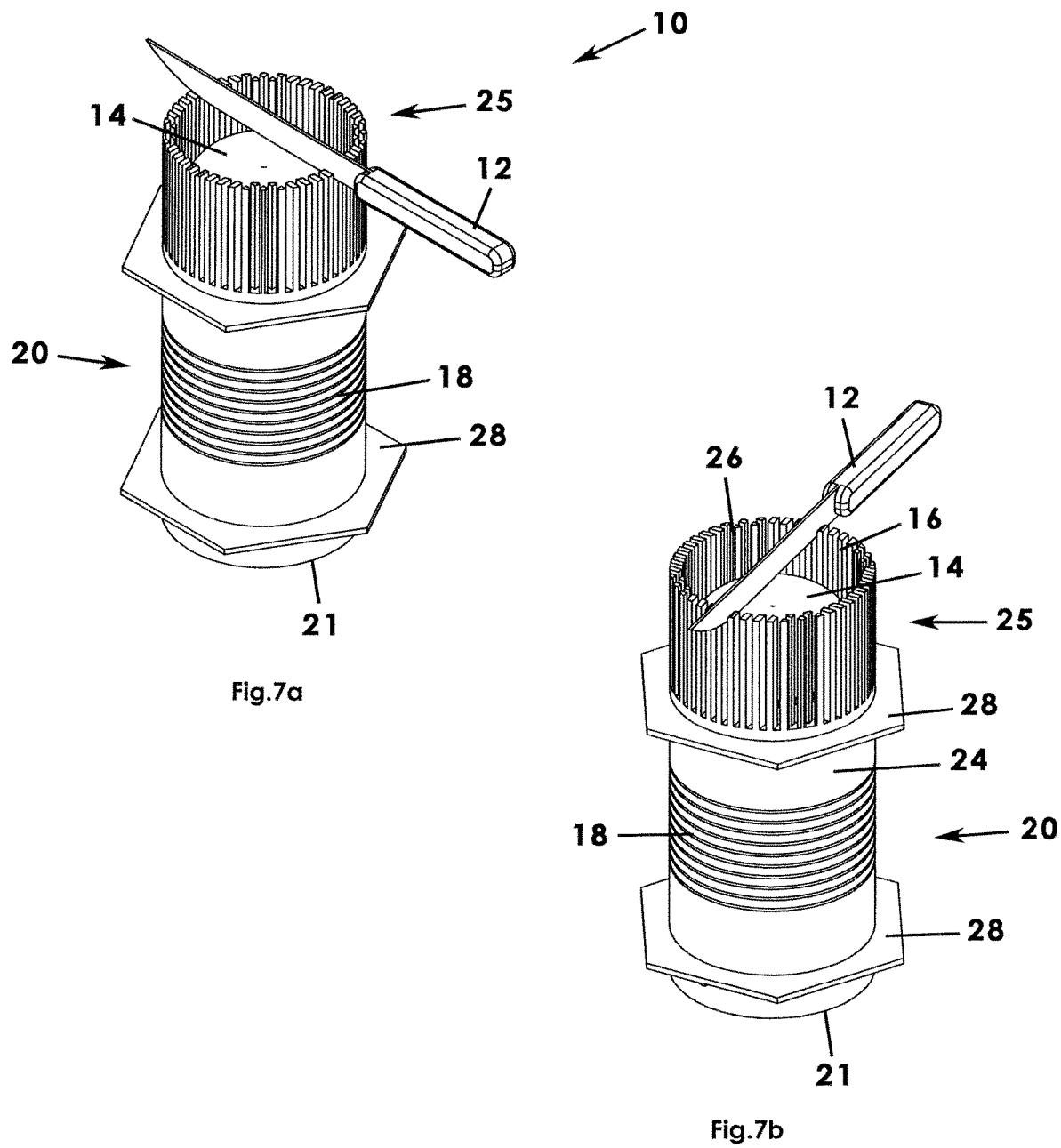
FIG. 7a is a perspective view of the tomato dicing assembly as in FIG. 6 illustrating a knife blade preparing to make a first slicing action according to the present invention.
FIG. 7b is a perspective view of the tomato dicing assembly as in FIG. 7a illustrating a knife blade preparing to make a second slicing action.

As described above, the body section 24 is a continuous wall that defines a plurality of second cutting slots 18. Preferably, each second cutting slot 18 extends partially about the body section and is displaced from an adjacent second cutting slot 18. In other words, the plurality of second cutting slots 18 is transverse or in a 90 degrees offset to the plurality of first cutting slots 16. It is understood that the width of each second cutting slot 18 may differ in various embodiments but is at least wide enough to receive the blade of a knife 12 for slicing a tomato 14 therein (FIG. 7a).

Next, the support member 30 also includes a tubular configuration and will be referenced as having a continuous support tube side wall 31 having a closed upper end 32 and an open lower end 33. More particularly, the upper end is a planar surface that defines a plurality of holes 34 arranged in a predetermined pattern. As will be seen below, the plurality of holes 34 are arranged and dimensioned to receive a plurality of spikes 42 that will be operable to impale the tomato 14 to be sliced. It is understood that the continuous support tube side wall 31 of the support member 30 has a diameter that allows the support member 30 to be received into the interior of the cutting guide member 20 and to receive the spike tube member 40.

Further, the spike tube member 40 also includes a cylindrical and tubular configuration by a continuous side wall 41 having a closed top 48 and defining an open bottom 49. The spike tube member 40 includes a plurality of spikes 42 extending longitudinally (i.e. upwardly) away from the closed top 48. It is understood that the plurality of spikes 42 are arranged and dimensioned in the same predetermined pattern and with dimensions complementary to related structures of the plurality of holes 34 described above. Accordingly, the plurality of spikes 42 is received by and extends through the plurality of holes 34 of the support member 30 when the spike tube member 40 is received through the open lower end of the support member 30 into the interior space of the support member 30.

In another aspect, the tomato dicing assembly 10 includes multiple structures for selectively guiding and holding the three main elements together in a concentric assembly. More particularly, the continuous support tube side wall 31 of the support member 30 defines an alignment slot 35 having a linear configuration that extends longitudinally between the open lower end 33 and a point adjacent the closed upper end 32 of the support member 30. The alignment slot 35 may also be referred to as the "straight slot" that runs like a channel in the longitudinal direction or axis defined by the continuous support tube side wall of the support member 30. Then, the spike tube member 40 includes a guide fastener 43, such as may be a pin or nub, adjacent the closed top of the spike tube member 40, the guide fastener 43 having a dimension and configuration complementary to the alignment slot 35. Accordingly, the guide fastener 43 may be inserted into the alignment slot 35 for guiding the plurality of spikes 42 in and through the plurality of holes 34 when the spike tube member 40 is inserted concentrically into the support member 30 as described above. In other words, alignment is guaranteed when inserting the spike tube member 40 into the support member 30.

Further, alignment structures guarantee alignment of the support member 30 and spike tube member 40 when inserted into the cutting guide member 20 (the outer tube). More particularly, the cutting guide member 20 includes an alignment member 27 mounted adjacent the distal end 22 thereof and extends inwardly (FIG. 1c), i.e. toward the interior area defined by the continuous side wall of the body section 24. Then, the continuous support tube side wall 31 of the support member 30 defines a locking slot (also referred to as a support member locking slot 36) having a dimension complementary to and operable to receive the alignment member 27 of the cutting guide member 20 as described above. Preferably, the support member locking slot 36 includes a proximal section 37 in communication with the open lower end 33 of the support member 30, a distal section 38 opposite said proximal section 37, and a main section 39 having a linear configuration extending between said proximal section 37 and said distal section 38, said proximal section 37 and said distal section 38 being offset from said main section 39. It will be understood that the proximal section 37 is in communication with said open lower end 33 and dimensioned to receive the alignment member 27 of the cutting guide member 20 for travel along the main section 39 as the support member 30 is received into the cutting guide member 20. Then, the alignment member 27 may be "locked" in place when the support member 30 is rotated (i.e. moved laterally) such that the alignment member 27 is moved into the distal section 38.

Similarly, the spike tube member 40 may also be locked into position and alignment with the cutting guide member 20. More particularly, the continuous side wall of the spike tube member 40 defines a locking slot (also referred to as a spike member locking slot 44) having a dimension complementary to and operable to receive the alignment member 27 of the cutting guide member 20 as described above (FIG. 1b). Note that the spike member locking slot 44 has a construction identical to that of the support member locking slot 36 and is referenced using primed numerals thereof. Specifically, the spike member locking slot 44 includes a proximal section 37' in communication with the open bottom 49 of the spike tube member 40, a distal section 38' opposite said proximal section 37', and a main section 39' having a linear configuration extending between said proximal section 37' and said distal section 38', said proximal section 37' and said distal section 38' being offset from said main section 39'. It will be understood that the proximal section 37' is in communication with said open bottom 49 and dimensioned to receive the alignment member 27 of the cutting guide member 20 for travel along the main section 39' as the spike tube member 40 is received into the cutting guide member 20. Then, the alignment member 27 may be "locked" in place when the spike tube member 40 is rotated (i.e. moved laterally) such that the alignment member 27 is moved into the distal section 38'.

Figure 8:
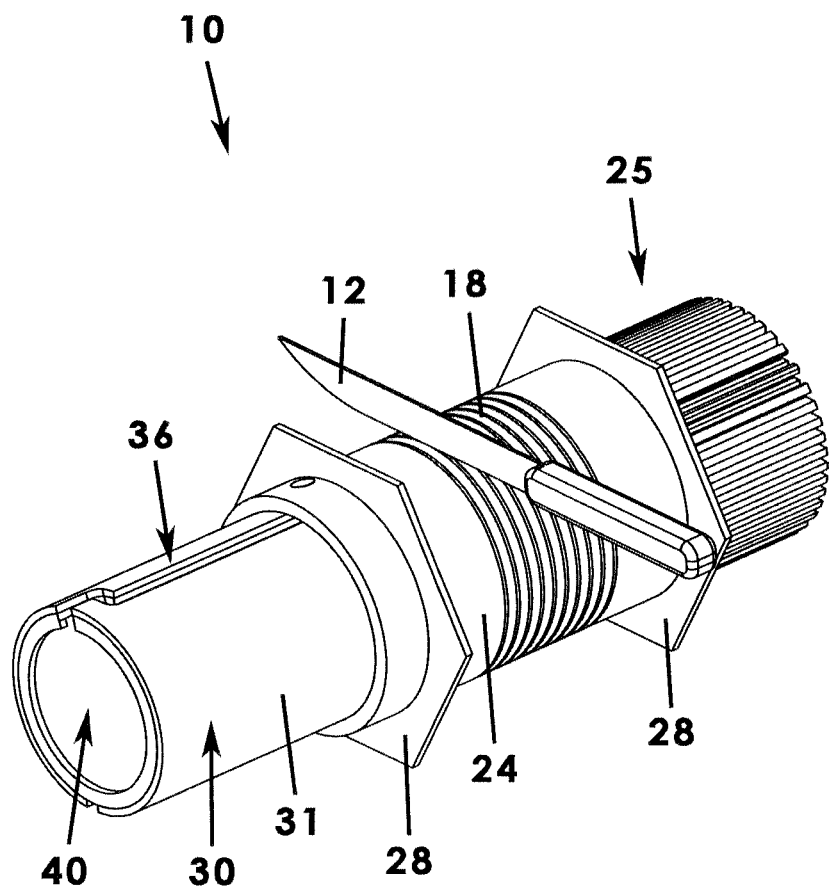
FIG. 8 is a perspective view of the tomato dicing assembly as in FIG. 7b illustrating a knife blade preparing to make a third slicing action.
Figure 9:
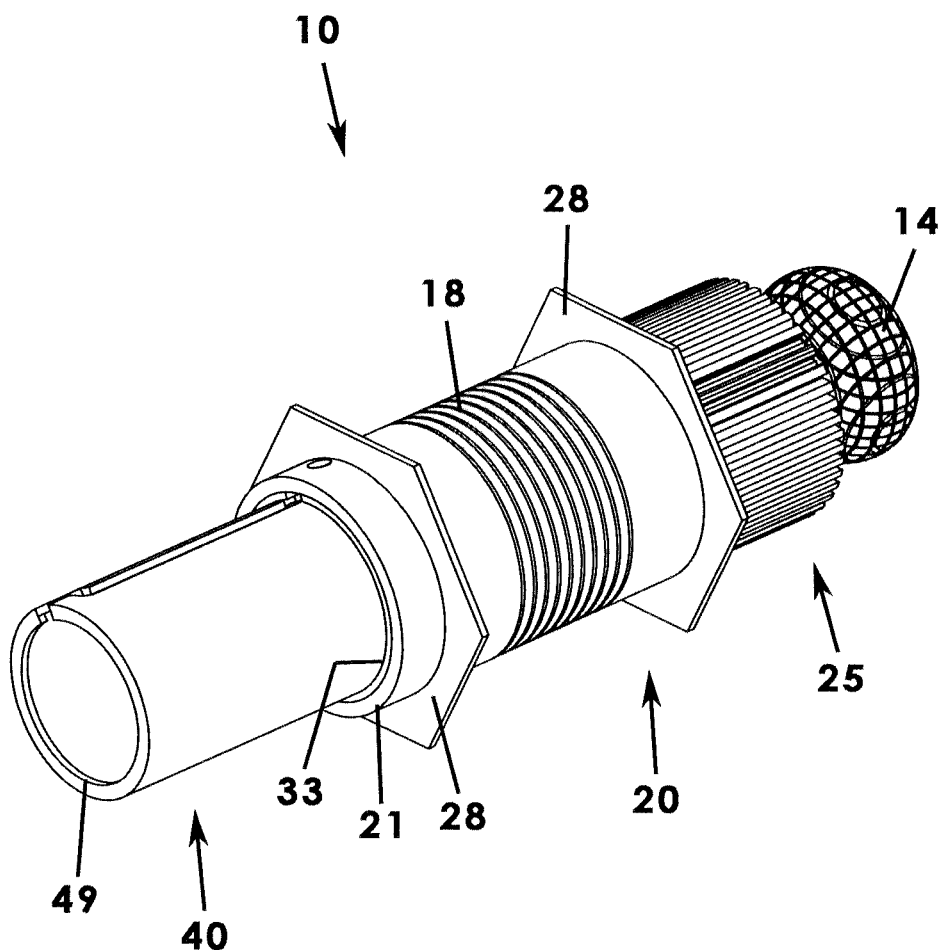
FIG. 9 is another perspective view of the tomato assembly as in FIG. 6, illustrating ejection of cubed tomato pieces after slicing actions are completed.

Now with further reference to the cutting guide member 20, the cutting guide member 20 includes a pair of standoff members 28 coupled to the proximal and distal ends of the body section 24 thereof and are operable to support the cutting guide member 20 when in a horizontal orientation on a flat surface such as a countertop or table. More particularly, each standoff member 28 has a plurality of peripheral edges offset in its angle from adjacent edges. Even more specifically, a standoff member 28 may have an octagonal configuration and, as a result, have 8 offset peripheral edges (FIG. 8).

In use, a tomato may be sliced in method according to the present invention to form cubed tomato pieces from a normally spherical tomato. More particularly, the three components of the tomato dicing assembly 10 are positioned in a concentrically conjoined arrangement as described above. For instance, the guide fastener 43 of the spike tube member 40 may be inserted into the alignment slot 35 and the spike tube member 40 is received into the support member 30. In this manner, the plurality of spikes 42 are received through the plurality of holes 34. Next, the combined support member 30 and spike tube member 40 are received into the interior space of the cutting guide member 20. Thereafter, the slicing steps of the present invention can begin.

Specifically, a generally spherical tomato 14 may be deposited into the area inside the cutting member 25 and impaled lightly by the plurality of spikes 42 as described. The blade of the knife 12 may be operated sequentially via successive insertions into respective slots of the plurality of first cutting slots 16 (FIG. 7a). A user may then manually rotate the cutting guide member 90 degrees and the knife 12 may be inserted in the first plurality of slots again (FIG. 7b). Next, the combined support member 30 and spike tube member 40 may be partially retracted (i.e. partially pulled out of the cutting guide member 20) and locked into place by rotating the two inner tubes so that the pin from the cutting guide member contacts the end of the L-shaped slot in the two inner tubes 30, 40. It is understood that this rotational locking action prevents the two inner tubes 30, 40 from migrating toward the open end of the cutting guide member 90 and prevents the knife blade from contacting the spike members. With the tomato 14 repositioned, the knife 12 may again be operated to be sequentially and successively inserted into the plurality of second cutting slots 18 (FIG. 8). Finally, the spike tube member 40 may be partially removed from the support member 30 (withdrawing the spikes from the plurality of holes 34 of the support member 30) and removed completely from the cutting guide member 20. Once the spikes (and spike tube member 40) are withdrawn, the now-cubed tomato pieces are free to fall through the open proximal end 21 of the cutting member 25 of the cutting guide member 20, such as into a bowl or food preparation receptacle (not shown).

It is understood that while certain forms of this invention have been illustrated and described, it is not limited thereto except insofar as such limitations are included in the following claims and allowable functional equivalents thereof.

The invention claimed is:

1. A tomato dicing assembly for making tomato cubes from a full tomato, comprising:
   a cutting guide member including a body section having a tubular configuration and including a cutting assembly extending longitudinally away from a distal end of said body section and that defines a plurality of first cutting slots, said body section having a cylindrical side wall defining a plurality of second cutting slots transverse to said plurality of first cutting slots;
   a support member having a continuous support tube side wall defining a tubular configuration and having a closed upper end and an open lower end, said closed upper end of said support member defining a plurality of holes spaced apart in a predetermined pattern; and
   a spike tube member having a continuous side wall defining a tubular configuration and having a closed top and an open bottom, said spike tube member including a plurality of spikes extending outwardly from said closed top and that are spaced apart from one another according to said predetermined pattern;
   wherein said support tube side wall defines an interior area dimensioned to selectively receive said spike tube member through said open lower end;
   wherein said plurality of spikes is selectively received through said plurality of holes when said spike tube member is received into said support member.

2. The tomato dicing assembly as in claim 1, wherein:
   said continuous support tube side wall defines an alignment slot having a linear configuration and extending longitudinally between said open lower end and a point adjacent said closed upper end;

said spike tube member includes a guide fastener adjacent said closed top, said alignment slot being dimensioned to receive said guide fastener for guiding said spike tube member into said interior area of said support tube side wall.

3. The tomato dicing assembly as in claim 1, wherein:

said continuous support tube side wall of said support member has a diameter larger than a diameter of said continuous side wall of said spike tube member such that said support member selectively receives said spike tube member;

said cutting guide member includes an open proximal end opposite said distal end and said body section defines an interior space in communication with said open proximal end, said open proximal end and said interior space having a diameter that is larger than the diameter of said continuous support tube side wall such that said support member is received into said interior space of said cutting guide member.

4. The tomato dicing assembly as in claim 3, wherein:

said cutting guide member includes an alignment member extending inwardly adjacent said open proximal end;

said continuous support tube side wall of said support member defines a support member locking slot having a proximal section, a distal section opposite said proximal section end, and a main section having a linear configuration extending between said proximal section and said distal section, said proximal section and said distal section being offset from said main section;

wherein said proximal section is in communication with said open lower end and dimensioned to receive said alignment member of said cutting guide member.

5. The tomato dicing assembly as in claim 4, wherein:

said continuous side wall of said spike tube member defines spike member locking slot having a proximal portion, a distal portion opposite said proximal portion end, and a main portion having a linear configuration extending between said proximal portion and said distal portion, said proximal portion and said distal portion being offset from said main portion;

wherein said proximal portion is in communication with said open bottom of said spike tube member and dimensioned to receive said alignment member of said cutting guide member.

6. The tomato dicing assembly as in claim 3, wherein:

said cutting guide member includes a pair of standoff members coupled to said body section adjacent said open proximal end and said distal end, respectively;

each standoff member includes a plurality of offset peripheral edges that resist movement when bearing against a surface;

said each standoff member extends transversely away from said body section.

7. The tomato dicing assembly as in claim 6, wherein said each standoff member has a octagonal configuration.

8. The tomato dicing assembly as in claim 1, wherein:

said cutting assembly includes a plurality of frame segments arranged in a ring configuration and spaced apart from one another so as to define said plurality of first cutting slots; and said plurality of said second cutting slots are spaced apart from and parallel to one another and each second cutting slot extends partially around said body section.

9. A tomato dicing assembly for making tomato cubes from a full tomato, comprising:

a cutting guide member that includes a tubular outside wall having an open proximal end and a distal end and a body section extending longitudinally between said proximal and distal ends; said cutting guide member including a cutting member coupled to and extending longitudinally away from said distal end and defining a plurality of first cutting slots;

wherein said body section having a cylindrical side wall defining a plurality of second cutting slots transverse to said plurality of first cutting slots;

a support member having a continuous support tube side wall defining a tubular configuration and having a closed upper end and an open lower end, said closed upper end of said support member defining a plurality of holes spaced apart in a predetermined pattern; and a spike tube member having a continuous side wall defining a tubular configuration and having a closed top and an open bottom, said spike tube member including a plurality of spikes extending outwardly from said closed top and that are spaced apart from one another according to said predetermined pattern;

wherein said plurality of spikes are selectively received through said plurality of holes when said spike tube member is received into said support member wherein said cutting guide member defines a diameter larger than a diameter defined by said support member which has a diameter larger than a diameter defined by said spike tube member such that said cutting guide member, said support member, and said spike tube member are concentrically positioned together.

10. The tomato dicing assembly as in claim 9, wherein:

said continuous support tube side wall defines an alignment slot having a linear configuration and extending longitudinally between said open lower end and a point adjacent said closed upper end;

said spike tube member includes a guide fastener adjacent said closed top, said alignment slot being dimensioned to receive said guide fastener for guiding said spike tube member into said interior area of said support tube side wall.

11. The tomato dicing assembly as in claim 9, wherein:

said continuous support tube side wall of said support member has a diameter larger than a diameter of said continuous side wall of said spike tube member such that said support member selectively receives said spike tube member;

said body section of said cutting guide member defines an interior space in communication with said open proximal end, said open proximal end and said interior space having a diameter that is larger than the diameter of said continuous support tube side wall such that said support member is received into said interior space of said cutting guide member.

12. The tomato dicing assembly as in claim 11, wherein:

said cutting guide member includes an alignment member extending inwardly adjacent said open proximal end;

said continuous support tube side wall of said support member defines a support member locking slot having a proximal section, a distal section opposite said proximal section end, and a main section having a linear configuration extending between said proximal section and said distal section, said proximal section and said distal section being offset from said main section;

wherein said proximal section is in communication with said open lower end and dimensioned to receive said alignment member of said cutting guide member.

13. The tomato dicing assembly as in claim 12, wherein:
said continuous side wall of said spike tube member defines a spike member locking slot having a proximal portion, a distal portion opposite said proximal portion end, and a main portion having a linear configuration extending between said proximal portion and said distal portion, said proximal portion and said distal portion being offset from said main portion;
wherein said proximal portion is in communication with said open bottom of said spike tube member and dimensioned to receive said alignment member of said cutting guide member.

14. The tomato dicing assembly as in claim 9, wherein:
said cutting guide member includes a pair of standoff members coupled to said body section adjacent said open proximal end and said distal end, respectively;
each standoff member includes a plurality of offset peripheral edges that resist movement when bearing against a surface;
said each standoff member extends transversely away from said body section.

15. The tomato dicing assembly as in claim 14, wherein said each standoff member has a octagonal configuration.

16. The tomato dicing assembly as in claim 9, wherein:
said cutting assembly includes a plurality of frame segments arranged in a ring configuration and spaced apart from one another so as to define said plurality of first cutting slots; and
said plurality of said second cutting slots are spaced apart from and parallel to one another and each second cutting slot extends partially around said body section.

\* \* \* \* \*